(12) United States Patent
Brick et al.

(10) Patent No.: US 11,999,394 B2
(45) Date of Patent: Jun. 4, 2024

(54) SYSTEM AND METHOD FOR RAILROAD TIE MANAGEMENT

(71) Applicant: BNSF Railway Company, Fort Worth, TX (US)

(72) Inventors: Michael James Brick, Fort Worth, TX (US); Samuel Minton, Brandon, SD (US); Christopher Neil Pickard, Argyle, TX (US); Phillip Hunt, Saginaw, TX (US); Justin Lee Devine, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/725,930

(22) Filed: Apr. 21, 2022

(65) Prior Publication Data

US 2022/0242466 A1   Aug. 4, 2022

Related U.S. Application Data

(63) Continuation of application No. 17/124,824, filed on Dec. 17, 2020, now Pat. No. 11,338,832.

(51) Int. Cl.
*B61L 23/04* (2006.01)
*B61K 9/08* (2006.01)

(52) U.S. Cl.
CPC .............. *B61L 23/048* (2013.01); *B61K 9/08* (2013.01); *B61L 23/047* (2013.01)

(58) Field of Classification Search
CPC ....... B61L 23/048; B61L 23/047; B61K 9/08; G06Q 10/0635; G06Q 10/087; G06Q 10/06315
See application file for complete search history.

(56) References Cited

U.S. PATENT DOCUMENTS

| 9,441,956 | B2 | 9/2016 | Kainer et al. |
| 9,672,486 | B1 | 6/2017 | Turpin |
| 9,904,274 | B2 | 2/2018 | Wetzel et al. |
| 2005/0039185 | A1 | 2/2005 | Heidari-Bateni |

(Continued)

OTHER PUBLICATIONS

N/A, Modern Cross-Tie Inspection and Planning Tools, Mar. 5, 2020.

(Continued)

*Primary Examiner* — Robert G Bachner
(74) *Attorney, Agent, or Firm* — Whitaker Chalk Swindle & Schwartz, PLLC; Enrique Sanchez, Jr.; Bradley J. Birchfield

(57) ABSTRACT

A Railroad Tie Management System is disclosed that can provide an efficient and organized method of inspecting and auditing ties in a rail system. Tie mark files can be retrieved by a client from a server or database in operable communication with the client, and upon instantiation of an inspection process governed by the system, an inspection information table and tie grid can be generated. The tie grid can operable to receive commands from a user, and the inspection information table is operable to automatically increment and decrement fields contained within in response to changes within the tie grid. The tie grid can also be configured to incorporate data from tie scans and serve the data to the client in a useful and user-friendly manner.

20 Claims, 12 Drawing Sheets

(56) References Cited

U.S. PATENT DOCUMENTS

| | | |
|---|---|---|
| 2011/0098918 A1* | 4/2011 | Siliski .................... H04M 1/04 |
| | | 701/533 |
| 2019/0012627 A1 | 1/2019 | Martin |
| 2020/0090084 A1 | 3/2020 | Tays et al. |

OTHER PUBLICATIONS

N/A, Protran Technology Inspection Tools, Mar. 25, 2020.
Joseph W. Palese, Donal R. Holfeld, Tie Planning Tools for the Track Inspector, Jan. 1, 1999.
N/A, Ensco Rail Digital Track Notebook, Mar. 25, 2020.
N/A, Railroad Track Inspection Software, Mar. 26, 2020.
Tom Judge, M/w tools you can use:Integrating an m/w program into an operationally tight railroad is challenging. Software-based planning tools can help make the job easier, Jan. 9, 2005.

* cited by examiner

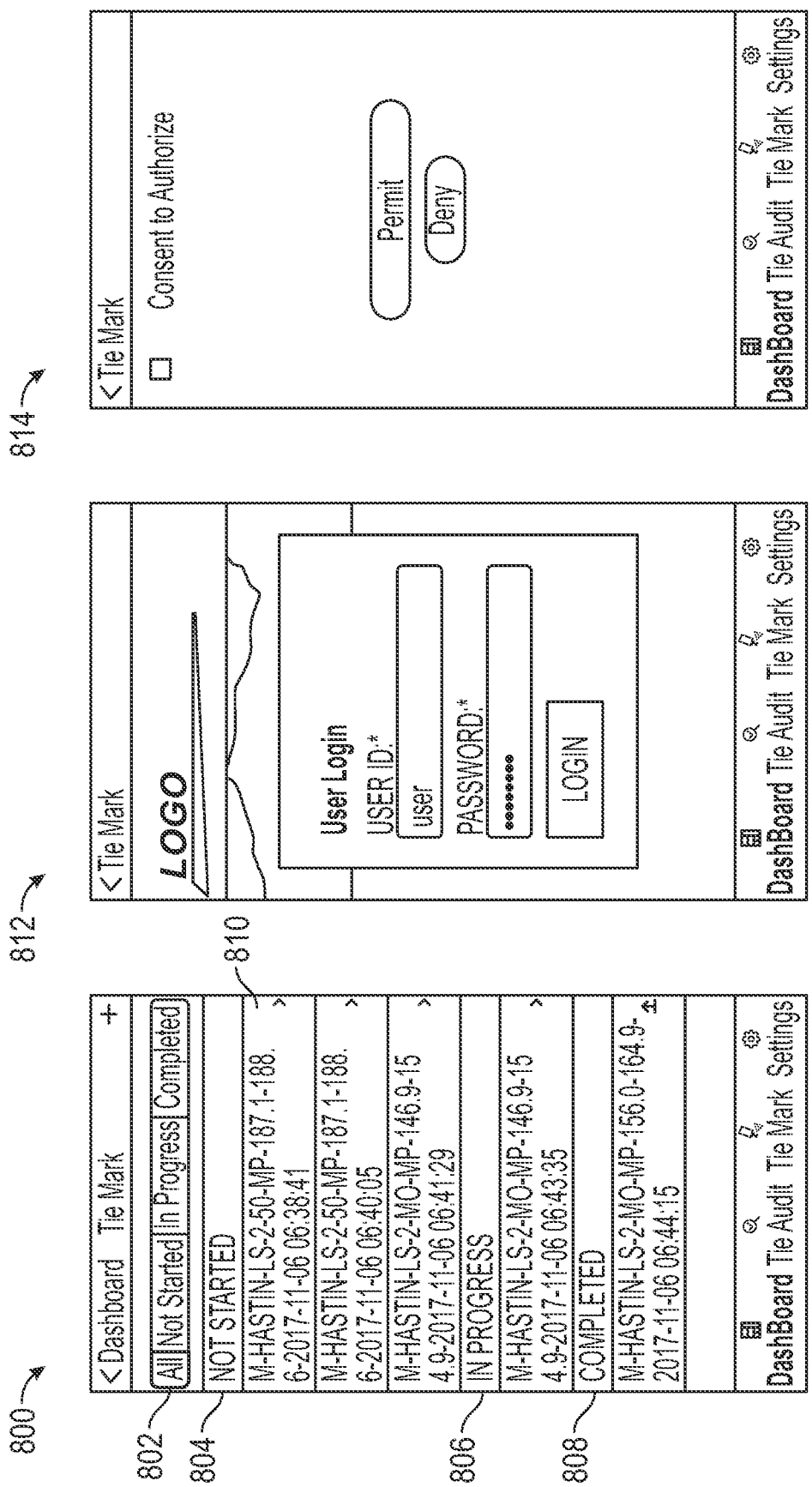

< Tie Mark Mark Download
Subdivision ▼ | Get Tie Plans |

Cancel          Done

HASTINGS
ST CROIX

< Tie Mark Mark Download
HASTINGS ▼ | Get Tie Plans |
M-PID-00014949I-MP-173.0-202.0 ▶
M-PID-000182284-MP-187.2-188.6 ▶
M-PID-000182285-MP-196.5-198.1 ▶
M-PID-000282643-MP-147.0-148.3 ▶

Plan Number: 000282643
Track Code: 5
Line Segment: 2
MP Range: 147 - 149
Begin MP: ☐
End MP: ☐

| Download | Download All |
*Max range of 10 can be downloaded

M-PID-000256320-MP-146.9-173.0 ▶
M-PID-000261503-MP-154.6-155.8 ▶
M-PID-000261504-MP-156.3-158.0 ▶

DashBoard  Tie Audit  Tie Mark  Settings

904 →

| < Dashboard  Tie Mark | + |
|---|---|
| All \| Not Started \| In Progress \| Completed | |
| NOT STARTED | |
| M-HASTIN-LS-2-50-MP-187.1-188.<br>6-2017-11-06 06:38:41 | ^ |
| M-HASTIN-LS-2-50-MP-187.1-188.<br>6-2017-11-06 06:40:05 | ^ |
| M-HASTIN-LS-2-MO-MP-146.9-15<br>4.9-2017-11-06 06:41:29 | ^ |
| IN PROGRESS | |
| M-HASTIN-LS-2-MO-MP-146.9-15<br>4.9-2017-11-06 06:43:35 | ^ |
| COMPLETED | |
| M-HASTIN-LS-2-MO-MP-156.0-164.9-<br>2017-11-06 06:44:15 | ⇱ |
| DashBoard  Tie Audit  Tie Mark  Settings | |

| < M-HASTIN-LS-2-MO-MP-146... Inspect |
|---|
| LOCATION |
| Division: PR |
| Subdivision: HASTINGS |
| Line segment: 2 |
| Track type: MO |
| Milepost range: 146.9-154.9 |
| MILEPOST |
| Milepost<br>range: 148 |
| Milepost direction \| Increasing \| Decreasing \|  — 908 |
| DATE LAST INSPECTED |
| 2016-07-08 00:00:00 |
| STATUS |
| Not Started |
| DashBoard  Tie Audit  Tie Mark  Settings |

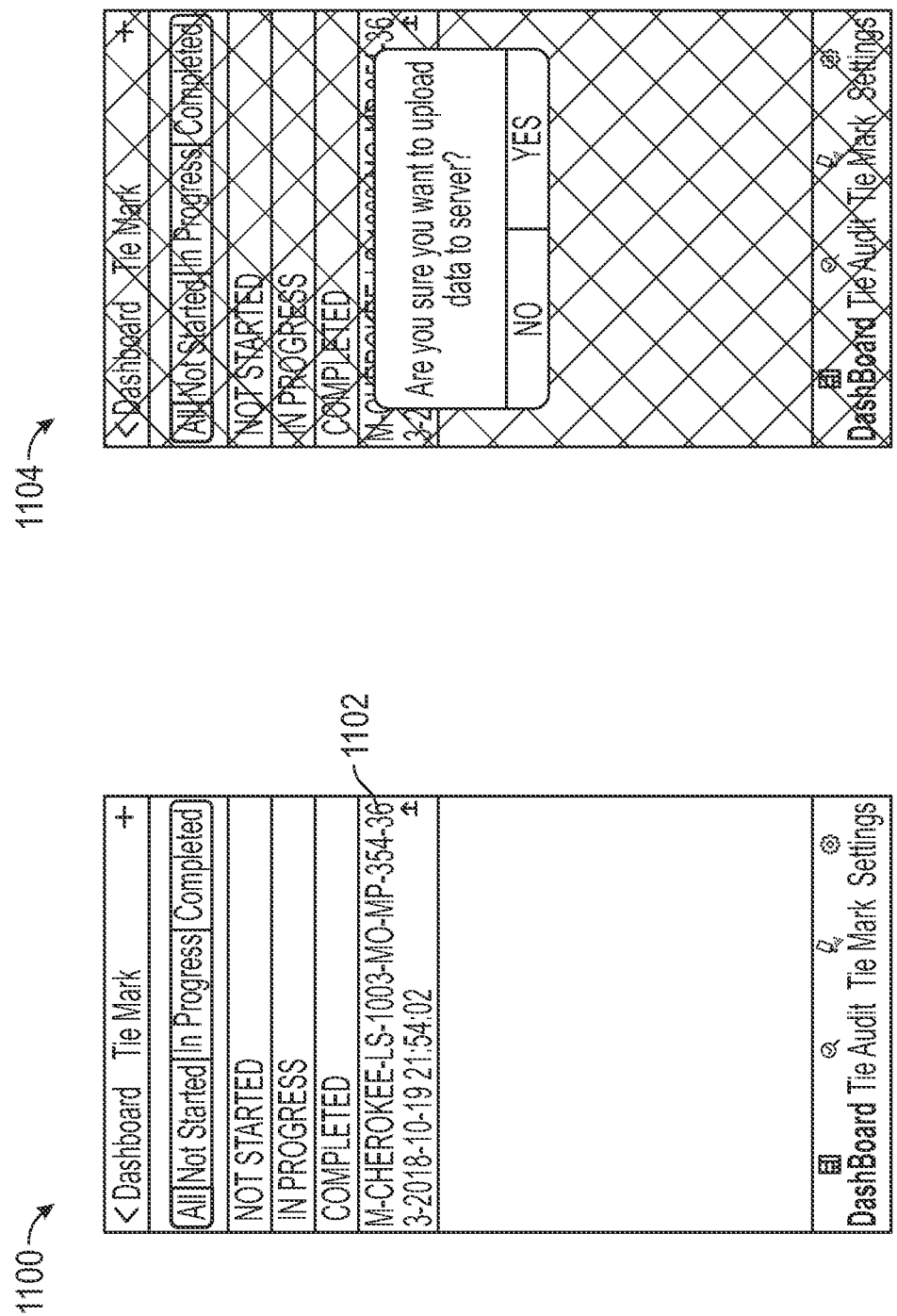

SYSTEM AND METHOD FOR RAILROAD TIE MANAGEMENT

CROSS-REFERENCE TO RELATED APPLICATIONS

The present application is a Continuation Application of U.S. patent application Ser. No. 17/124,824, filed on Dec. 17, 2020, entitled "SYSTEM AND METHOD FOR RAILROAD TIE MANAGEMENT," the contents of which are incorporated herein in their entireties for all purposes.

TECHNICAL FIELD

The present disclosure generally relates to the management of railroad ties disposed throughout a railroad system infrastructure.

BACKGROUND

Rail transport systems traverse entire continents to enable the transport and delivery of passengers and goods throughout the world. A quintessential component of railroad infrastructure is the track—laid over a myriad of geographies and terrains, railroad tracks are designed to withstand the worst of the elements and facilitate disbursement of locomotives throughout the railroad system. Because of this constant exposure of the tracks to hazardous conditions, railroad companies must be vigilant in maintaining track integrity; if a section of track is compromised and the damage or obstruction is not quickly addressed, the consequences can be catastrophic.

There are millions of ties in any given railroad infrastructure, and their integrity must be maintained at all times to ensure the safe travel of freight cars on the tracks. To ensure tie integrity, railroad systems utilize specialized equipment to inspect the ties and determine the overall condition of the ties. For example, Aurora® scanning technology, disposed on trucks capable of traveling on rails, are used to gather data regarding the exterior (i.e. surface conditions such as cracks, breaks, etc.)) and interior (i.e. density changes due to rot, disintegration, etc.) of the ties. For management purposes, railroad tracks are often broken up into divisions, subdivisions, line segments, etc., and locations on the track are often referred to by milepost markers, much like mile markers on a highway. Additionally, railroad ties are often labeled by individual numbers that correspond to the specific area they are in. For example, a railroad tie can be number 5423 in a specific subdivision, and railroad personnel can narrow down the search for this specific tie by looking in between the mileposts the tie is known to lay between.

While such organizational methods and specialized equipment are useful in gathering and managing information about railroad ties, railroad personnel are still needed to further inspect ties and make the final decision as to whether a tie needs to be replaced. However, the monitoring and inspecting of millions of ties in a railroad system is extremely difficult to manage and organize.

SUMMARY

The present disclosure achieves technical advantages as a System and Method for Railroad Tie Management that can provide an organizational and adaptive infrastructure configured to facilitate railroad tie inspection. The system enables individual clients to have segmented, assignable access to the entire tie mark file system and only access tie mark files as needed or assigned. The system can provide a customizable user interface to identify, characterize, and process information related to railroad ties. Additionally, the railroad tie management system can generate an inspection information table and a tie grid to facilitate tie inspection management.

The present disclosure solves the technological problem of organizing and managing the multitude of ties in any given railroad infrastructure. For example, the railroad tie management system can document information for railroad ties by milepost, track code, and line segment, identify and alert a user as to those ties that are scheduled to be replaced, and algorithmically determine from tie scans a tie grade for each tie for processing in accordance with a railroad tie replacement schedule. The system is operable to receive commands relevant to tie inspection on a per-tie basis and ties marked for replacement can be easily unmarked. The system can integrate data generated by various scanning technologies and can provide real-time (sub millisecond) data to inspectors that can be directly and immediately leveraged during the inspection process. This will save the inspectors time and help ensure the accuracy of the information being entered into the system.

Track ties are a key component of railroad track infrastructure. The wheels of the locomotive travel along two parallel railroad track rails. Railroad ties can be slats that are laid between and underneath the rails of a track. The rails can be secured substantially perpendicularly to the ends of the ties. The ties can maintain the three-dimensional coordinates of the track—"gauge," "line," and "surface." The track gauge can refer to the distance between the two railroad track rails, the track gage must be preserved for the proper operation of the freight cars on the rails. The line of the track can refer to the planar position of the rails. For example, the rails can be straight or calculatedly curved around obstacles, such as a mountainside. The "surface" of the track can be the vertical displacement of the rails, such as when the rails traverse hilly areas. Ties can be made of many different materials, including wood, concrete, metal, plastic, or any other material suitable to maintain the predetermined gauge, line, and surface of the rails.

The railroad tie management system can include a networked server in operable communication with a database, wherein networked computing devices can access the database via the server to retrieve tie mark files for inspection process instantiation. In another exemplary embodiment, the railroad tie management system comprises control logic operable to receive user commands to edit a tie mark file accordingly. In another embodiment, a railroad tie management system includes a multitude of subsystems through which tie management and inspection can be achieved, such as a dashboard subsystem, a tie mark retrieval subsystem, a tie audit subsystem, and a settings subsystem.

In one exemplary embodiment, the present disclosure can include a method for managing ties in a railroad system, the method comprising the steps of: creating and storing in memory a plurality of tie mark files; receiving a request via an encrypted network for a first tie mark file having railroad tie data; serving the first tie mark file to the client via the encrypted network; and instantiating, via a processor, an inspection process to generate an inspection information table and a tie grid, using the railroad tie data, wherein the tie grid includes metadata related to a first tie. The method further comprising the step of sorting the first tie mark file according to predetermined categories. The method further comprising the step of selecting a first tie mark file. Wherein the first tie mark file includes the ties for a predetermine section of a railroad track. The method further comprising receiving an entry selecting the first tie and generating a graphic emphasizing the selection via the processor. The method further comprising generating an indication if the first tie is marked for replacement. The method further comprising changing the first tie metadata, via the processor, if a FLIP command is received. The method further comprising instantiating an image capture function of the client and storing a captured image in the first tie metadata. The method further comprising instantiating, via the processor, a user input field and storing input data in the first tie metadata. The method further comprising determining railroad track characteristics and displaying the railroad track characteristics in the tie grid.

In another exemplary embodiment, the present disclosure can include railroad tie management system, including: a data storage device comprising a first database with a plurality of tie mark files; and a networked computer processor operably coupled to the storage device via an encrypted network and capable of executing machine-readable instructions to perform program steps, the program steps comprising: retrieving a tie mark file from the database; instantiating an inspection process on the tie mark file to generate an inspection information table and a tie grid having metadata related to a plurality of ties; editing the tie mark file; and storing the edited tie mark file to the database. Wherein the program steps further comprise receiving an entry selecting a first tie in the tie grid and generating a graphic emphasizing the selection via the processor. Wherein the program steps further comprise generating an indication if a tie in the tie grid is marked for replacement. Wherein the program steps further comprise changing the first tie metadata, via the processor, if a FLIP command is received. Wherein the program steps further comprise instantiating an image capture function of the client and storing a captured image in the first tie metadata. Wherein the program steps further comprise instantiating, via the processor, a user input field and storing input data in the first tie metadata. Wherein the program steps further comprise determining railroad track characteristics and displaying the railroad track characteristics in the tie grid.

In another exemplary embodiment, the present disclosure can include a rail tie status processing system, including: a data storage device having a plurality of tie mark files; and a networked computer processor operably coupled to the storage device via an encrypted network and capable of executing machine-readable instructions to perform program steps, the program steps comprising: receiving the location of a client device; indicating the start point and direction of travel on the client device; generating a rail tie status indicator for each of a plurality of railroad ties in a rail tie file; and receiving input verifying or changing the status of the rail tie. The system further comprising displaying a graphic showing one or more rail ties for a section track associated with the rail tie file. Wherein the graphic can indicate the tie type, the tie number, attributes or characteristics related to the railroad tracks.

BRIEF DESCRIPTION OF THE DRAWINGS

FIGS. 8A-8C illustrates an exemplary embodiment of a railroad tie management system component, in accordance with one or more exemplary embodiments of the present disclosure;

FIGS. 9A-9D illustrate a railroad tie management system interface to provide tie mark files to the client device for download, in accordance with one or more exemplary embodiments of the present disclosure;

FIGS. 10A-10F illustrate an exemplary embodiment of a railroad tie management system component, in accordance with one or more exemplary embodiments of the present disclosure; and FIGS. 11A-11B illustrate an exemplary embodiment of a railroad tie management system component, in accordance with one or more exemplary embodiments of the present disclosure.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
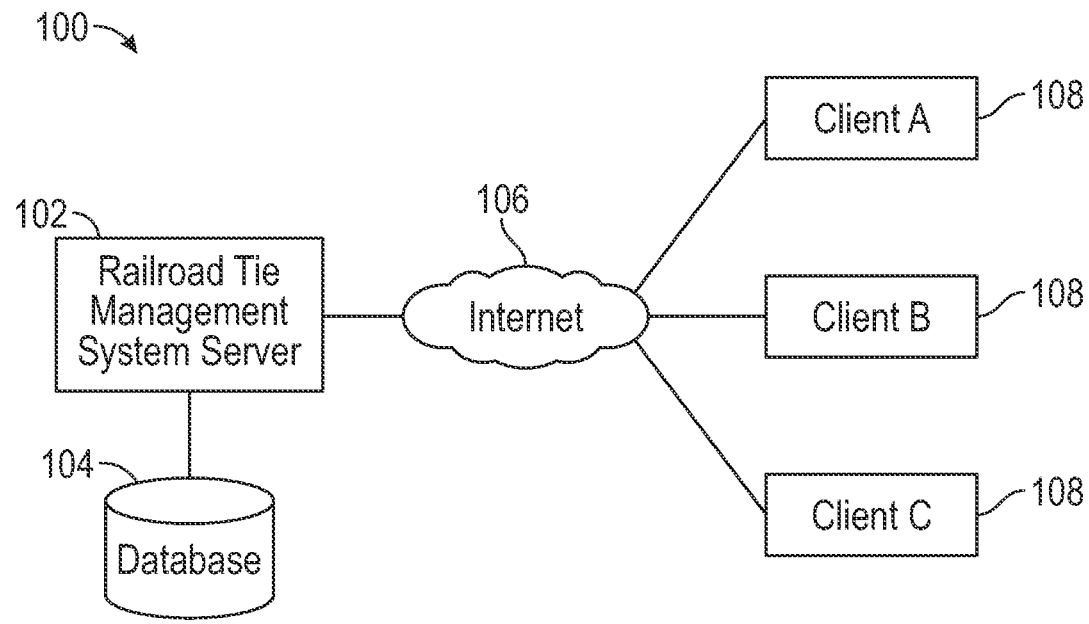
FIG. 1 illustrates an exemplary railroad tie management system in accordance with one or more exemplary embodiments of the present disclosure.

FIG. 1 illustrates a schematic view of a railroad tie management system 100, in accordance with one or more embodiments of the present disclosure. The railroad tie management system 100 can included a railroad tie management system server 102 operably coupled to a database 104. The server 102 can be operably coupled to one or more clients 108, via a network connection 106. The clients 108 can be a physical device (e.g., mobile phones, computers, or other suitable device), program, or applications. In another exemplary embodiment, a client 108 can include a mobile device with a mobile application configured to communicate with the server 102.

The server can be implemented in hardware, software, or a suitable combination of hardware and software therefor, and may comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server (s). Additionally, the server can include memory.

Memory can comprise electronic storage that can include non-transitory storage media that electronically stores information. The electronic storage media of electronic storage may include one or both of system storage that can be provided integrally (i.e., substantially non-removable) with server(s) and/or removable storage that can be removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store machine-readable instructions, software algorithms, information determined by processor(s), information received from server(s), information received from computing platform(s), and/or other information that enables server(s) to function as described herein. The electronic storage can also be accessible via a network connection.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information, such as FPGAs or ASICs. The processor(s) may be a single entity or include a plurality of processing units. These processing units may be physically located within the same device, or processor(s) may represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server can be configured with machine-readable instructions having one or more functional modules. The machine-readable instructions can be implemented on one or more servers, having one or more processors, with access to memory. The machine-readable instructions can be a single networked node, or a machine cluster, which can include a distributed architecture of a plurality of networked nodes. The machine-readable instructions can include control logic for implementing various functionality, as described in more detail below. The machine-readable instructions can include certain functionality associated with the railroad tie management system 100.

For the railroad tie management system 100, the format for messages transmitted to and from, for example, the server 102 and clients 108, can include any format, including JavaScript Object Notation (JSON), TCP/IP, XML, HTML, ASCII, SMS, CSV, API, or other suitable format. Each message can consist of a message header, header properties, and a message body, or be encapsulated and packetized by any suitable format having same, including representational state transfer (REST). The aforementioned system components (e.g., server(s) and client(s)) can be communicably coupled to each other via the Internet, intranet, or other suitable network. The message transmission can be encrypted, unencrypted, over a VPN tunnel, or other suitable communication means. The components of the system 100 can be a connected via WAN, LAN, PAN, or other suitable network 106. The network communication between the clients 108 and the sever 100 can be encrypted using PGP, Blowfish, Twofish, AES, 3DES, HTTPS, or other suitable encryption. The system 100 can be configured to communicate with the various other systems and modules disclosed herein using Wi-Fi, Bluetooth, Ethernet, or other suitable communication protocol. The network communication can occur via application programming interface (API), PCI, PCI-Express, ANSI-X12, Ethernet, Wi-Fi, Bluetooth, or other suitable communication protocol. Additionally, third party databases can be operably connected to the system components via the network 106.

Figure 2:
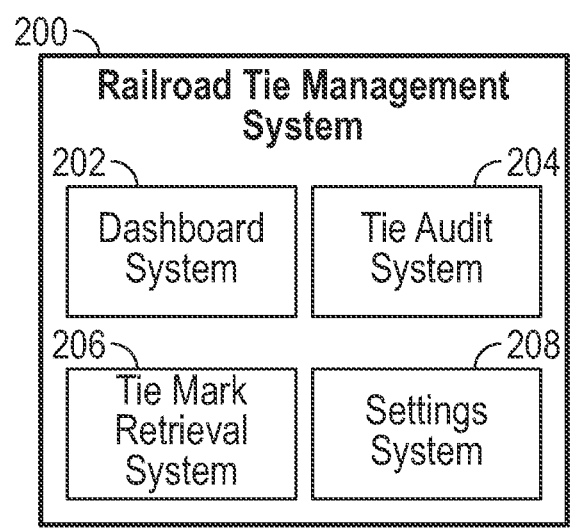
FIG. 2 illustrates an exemplary diagram of a railroad tie management system in accordance with one or more exemplary embodiments of the present disclosure.

FIG. 2 shows a diagram of a railroad tie management system 200 with a number of subsystems, including, for example, a dashboard system 202, a tie audit system 204, a tie mark retrieval system 206, and a settings system 208, in accordance with one or more exemplary embodiments according to the present disclosure. In one embodiment, the tie audit system 204, tie mark retrieval system 206, and settings system 208 can be subsystems of the dashboard system 202. In one exemplary embodiment, the railroad tie management system 200 is implemented partly via a mobile application on a smart device, wherein aspects of the system are responsive to user commands and inputs to achieve variable results. For example, the railroad tie management system 200 can include a smartphone executing machine-readable instructions comprising an installed mobile application that includes the dashboard system 202. Via the dashboard 202, the user can communicate with the railroad tie management system server 102 and database 104 via the internet 106, as seen in FIG. 1. In another exemplary embodiment, the railroad tie management system 200 can be implemented as an application on a smart device and be in operable communication with the server 102 and database 104, and the dashboard system 202, tie audit system 204, tie mark retrieval system 206, and settings system 208 can operate as subsystems to the implemented application.

Figure 3:
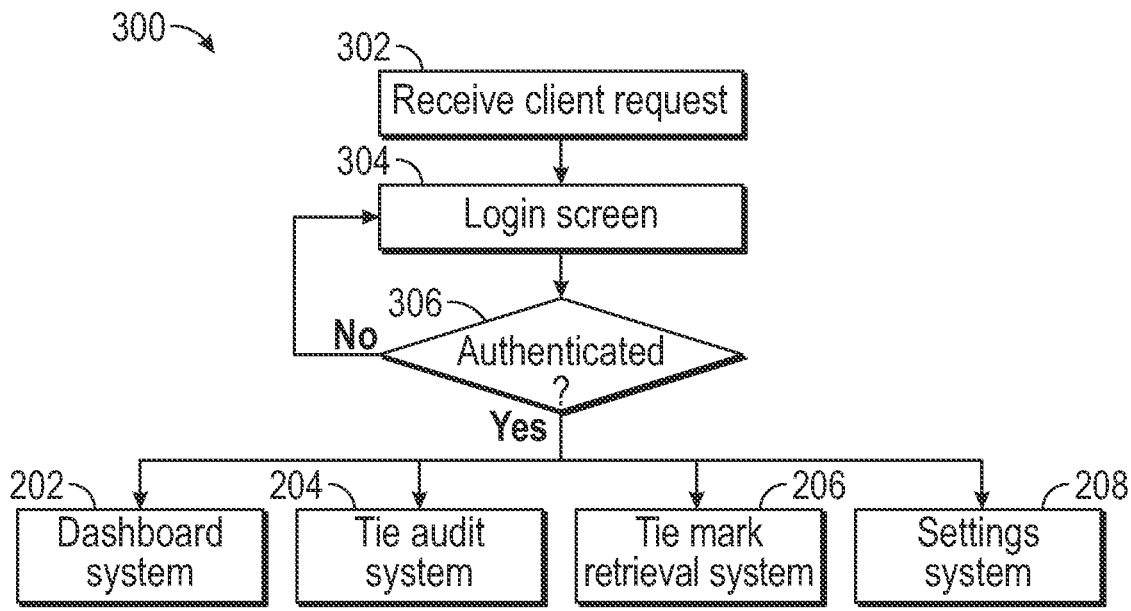
FIG. 3 illustrates railroad tie management system control logic in accordance with one or more exemplary embodiments of the present disclosure.

FIG. 3 illustrates a flow chart diagram 300 exemplifying control logic embodying features of a method for railroad tie dashboard generation and management, in accordance with one or more exemplary embodiments of the present disclosure. The railroad tie dashboard control logic 300 can be implemented as an algorithm on a server, a machine learning module, or other suitable system. The railroad tie dashboard control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The railroad tie dashboard control logic 300 can leverage the ability of a computer platform to spawn multiple processes and threads by processing data simultaneously. The speed and efficiency of the railroad tie dashboard control logic 300 can be greatly improved by instantiating more than one process to generate and manage a railroad tie dashboard. However, one skilled in the art of programming will appreciate that use of a single processing thread may also be utilized and is within the scope of the present disclosure.

The railroad tie dashboard control logic 300 process flow of the present embodiment begins at step 302, where the control logic 300 can receive an access request from a client. In one exemplary embodiment, the client can be a mobile application executed on a mobile smart device, according to the present disclosure. The control logic 300 then proceeds to step 304.

At step 304, the control logic 300 can generate and render a login screen to allow the user to access the system. In one exemplary embodiment, the client can prompt a user to enter a username and password, fingerprint, face image, or other suitable data. The control logic 300 then proceeds to step 306.

At step 306, the control logic 300 can determine whether a user authentication is successful. In one exemplary embodiment, the control logic 300 can initiate the authentication of user credentials, via authentication key matching, or other suitable authentication method. If the authentication 306 fails, the client can redisplay the login screen 304 and redisplay the login screen 304 until the authentication is successful, or the maximum number of attempts is reached. If the authentication 306 is successful, the client can display a dashboard having links to one or more of systems and subsystems, such as, for example, the dashboard system 202, tie audit system 204, tie mark retrieval system 206, and settings system 208. In another exemplary embodiment, the dashboard system 202 can render and retrieve railroad tie files locally. In another exemplary embodiment, the dashboard system 202 can retrieve railroad tie files stored in a remote database or other suitable location. The dashboard system 202 can also render an indication of the number of ties audited and the number of ties marked. The rendering can be on a client device. In another exemplary embodiment, the dashboard system 202 can also identify a status of available railroad tie files. For example, the status can include an indication that a file is "in progress" or "completed," among other suitable status. In another exemplary embodiment the railroad tie files can be sorted according to status. The control logic 300 then terminates or awaits new authentication information and can repeat the aforementioned steps.

Figure 4:
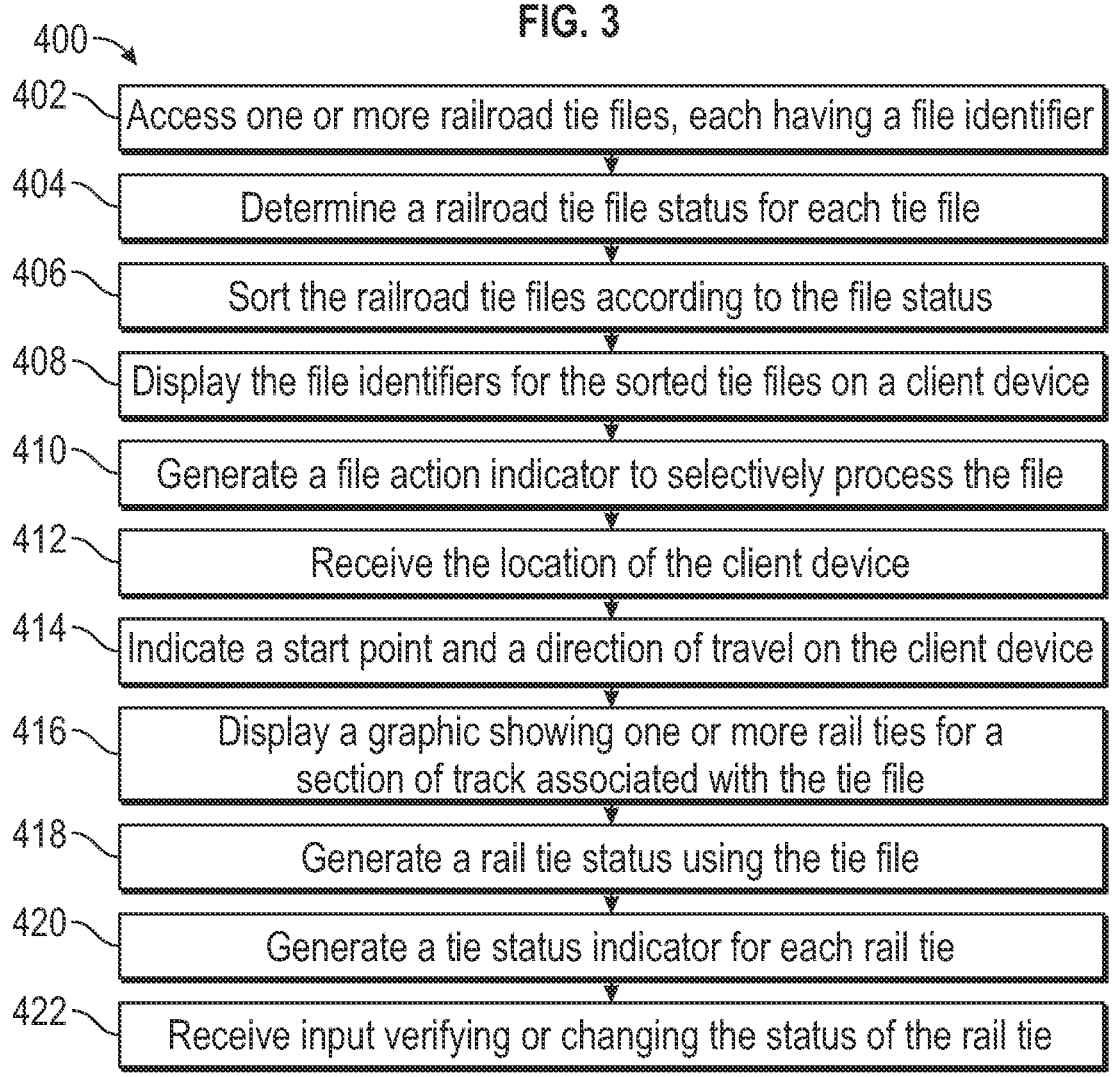
FIG. 4 illustrates rail tie status processing control logic, in accordance with one or more exemplary embodiments of the present disclosure.

FIG. 4 illustrates a flow chart diagram 400 exemplifying control logic embodying features of a method for rail tie status processing, in accordance with one or more exemplary embodiments of the present disclosure. The rail tie status processing control logic 400 can be implemented as an algorithm on a server, a machine learning module, or other suitable system. The rail tie status processing control logic 400 can be achieved with software, hardware, an application programming interface (API), a network connection, a network transfer protocol, HTML, DHTML, JavaScript, Dojo, Ruby, Rails, other suitable applications, or a suitable combination thereof.

The rail tie status processing control logic 400 can leverage the ability of a computer platform to spawn multiple processes and threads by processing data simultaneously. The speed and efficiency of the rail tie status processing control logic 400 can be greatly improved by instantiating more than one process to process the status of a rail tie. However, one skilled in the art of programming will appreciate that use of a single processing thread may also be utilized and is within the scope of the present disclosure.

The rail tie status processing control logic 400 process flow of the present embodiment begins at step 402, where the control logic 400 can access one or more railroad tie files. In one exemplary embodiment, the tie files can include a file identifier. The file identifier can be a file name or other unique identifier. In another exemplary embodiment, the file identifier can be related to the railroad track segment, location, or other relevant information. In another exemplary embodiment the railroad tie files can be accessed on a client device, such as a mobile application executed on a mobile smart device, a laptop, a smartwatch, or other suitable device. The control logic 400 then proceeds to step 404.

At step 404, the control logic 400 can determine a railroad tie file status for each tie file. In one exemplary embodiment, the file status can indicate whether, how, when, where, and by whom the file has been used by the control logic 400. In another exemplary embodiment, the file status can include "not started," "in progress," and "completed," among other relevant status. The control logic 400 then proceeds to step 406.

At step 406, the control logic 400 can sort the railroad tie files according to the file status. In one exemplary embodiment, the file status can be sorted according to whether, how, when, where, and by whom the file has been used by. In one exemplary embodiment, the tie mark files can be sorted by the control logic 400 according to sequential search, bubble search, or quick search algorithms, among others. The control logic 400 then proceeds to step 408.

At step 408, the control logic 400 can display the file identifiers for the sorted tie files on a client device. The control logic 400 then proceeds to step 410.

At step 410, the control logic 400 can generate a file action indicator to selectively process the tie file. In one exemplary embodiment, the file action indicator can be a symbol or character displayed proximate a file identifier on the client device. In another exemplary embodiment, the file action indicator can instantiate a process that can upload a completed type file, open a tie file, or download a tie file, among other relevant actions. The control logic 400 then proceeds to step 412.

At step 412, the control logic 400 can Receive the location of the client device. In one exemplary embodiment, a GPS receiver can be disposed within or operably coupled to the client device. The control logic 400, can receive the GPS coordinates of the client device, to identify the location of the client device. In another exemplary embodiment, the location of the client device can be identified via a symbol on a map displayed on the client device. The control logic 400 then proceeds to step 414.

At step 414, the control logic 400 can indicate a start point and a direction of travel on the client device. In one exemplary embodiment, the control logic 400 can generate a notification or indication a direction of travel to the start point. The start point and the direction of travel can be indicated as symbols on a map, audible instructions played via speakers on the client device, textual directions (e.g., latitude and longitude), or other suitable means. The control logic 400 then proceeds to step 416.

At step 416, the control logic 400 can display a graphic showing one or more rail ties for a section of track associated with the tie file. In one exemplary embodiment, the graphic can indicate the tie type, the tie number, attributes or characteristics related to the railroad tracks, or other relevant information. The control logic 400 then proceeds to step 418.

At step 418, the control logic 400 can generate a rail tie status using the tie file. In one exemplary embodiment, the rail tie status can indicate the nature or condition of the rail tie. For example, the rail tie status can indicate whether a tie is worn, needs to be replace or acceptable. In another exemplary embodiment the control logic 400 can retrieve the status from the tie file and populate the status of the rail tie via automated scanning for verification. In another exemplary embodiment, the tie file can be an XML file having a plurality of fields describing various characteristics of a rail tie, a section or railroad, or other relevant subject matter. The control logic 400 then proceeds to step 420.

At step 420, the control logic 400 can generate a tie status indicator for each rail tie. In one exemplary embodiment, a symbol or character can be generated by the control logic by correlating the tie status with a library of status indicators to display the relevant indicator at or near each rail tie in the client device display. The control logic 400 then proceeds to step 422.

At step 422, the control logic 400 can receive input verifying or changing the status of each rail tie in the tie file. In one exemplary embodiment, the control logic can generate and display one or more status for a rail tie such that a user can select an appropriate status. In another exemplary embodiment, the control logic 400 can generate controls for incrementing or decrementing through each rail tie. Once the desired rail tie is selected the control logic 400 can receive input from a user regarding the status of the rail tie, either verifying or "flipping" the status of the selected rail tie. The control logic 400 then terminates or awaits input to repeat the aforementioned steps.

Figure 5:
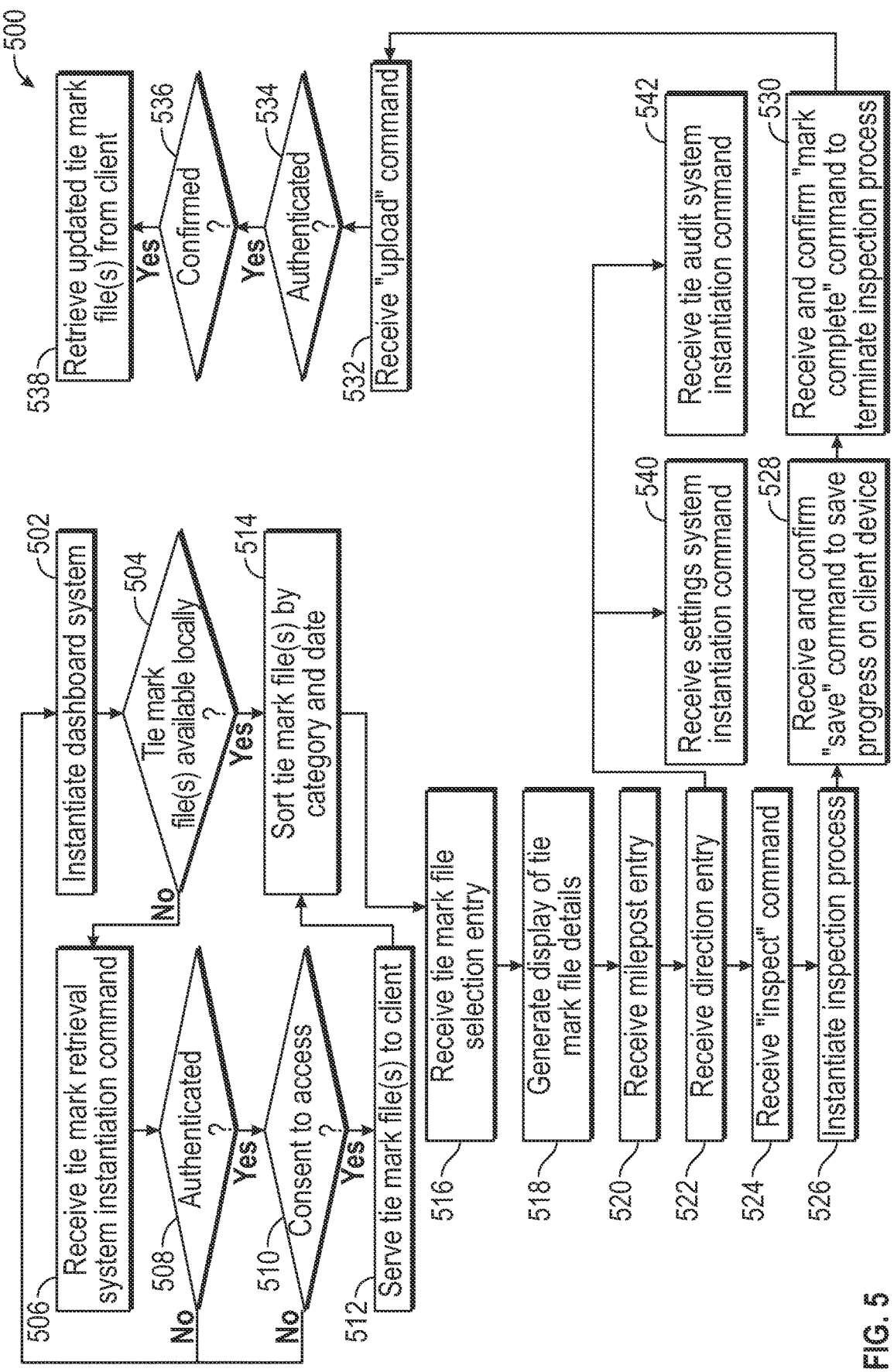
FIG. 5 illustrates railroad tie management and processing system control logic in accordance with one or more exemplary embodiments of the present disclosure.

FIG. 5 illustrates a flow chart diagram 500 exemplifying control logic embodying features of a method for railroad tie file management and processing, in accordance with one or more exemplary embodiments of the present disclosure. The railroad tie file control logic 500 can be implemented as an algorithm on a server, a machine learning module, or other suitable system. The railroad tie file control logic 500 can be achieved with software, hardware, an application programming interface (API), a network connection, a network transfer protocol, HTML, DHTML, JavaScript, Dojo, Ruby, Rails, other suitable applications, or a suitable combination thereof.

The railroad tie file control logic 500 process flow of the present embodiment begins at step 502, where the control logic 500 can instantiate of the dashboard system 502. In one exemplary embodiment, the client can be a mobile application executed on a mobile smart device, according to the present disclosure. The control logic 500 then proceeds to step 504. At step 504, the control logic 500 can determine whether tie mark files are available locally (e.g., stored on the client device). In another exemplary embodiment, the control logic 500 can determine whether the tie mark files can be accessed remotely (e.g., on a network-attached storage, server, database, or other suitable remote location). If a desired tie mark file is available locally, the control logic 500 proceeds to step 514. If a desired tie mark file is not available locally, the control logic 500 proceeds to step 506.

At step 506, the control logic 500 can instantiate the tie mark retrieval system 506. In one exemplary embodiment, the control logic 500 can be instantiated to facilitate the serving of tie mark files from the railroad tie management system server or database to the client. The control logic 500 then proceeds to step 508.

At step 508, the control logic 500 can determine whether an authentication is successful. The authentication can be for a user, a device, or other suitable entity. In one exemplary embodiment, the control logic 500 can initiate the authentication of user credentials, via authentication key matching, or other suitable authentication method. If the authentication 508 fails, the control logic 500 proceeds to step 502. If the authentication 508 is successful, the control logic 500 proceeds to step 510.

At step 510, the control logic 500 can generate a user prompt to verify the user's consent to permissions requested by the server 510. In one exemplary embodiment, requested permissions can include access to client resources, such as microphone, network, and other suitable resources, as well as client location and data. The control logic 500 then proceeds to step 512.

At step 512, the control logic 500 can serve the requested tie mark files to the client 512. In one exemplary embodiment, the tie mark files can be transmitted via an encrypted network. The network communication between the client and the server can be encrypted using PGP, Blowfish, Twofish, AES, 3DES, HTTPS, or other suitable encryption. The control logic 500 then proceeds to step 514.

At step 514, the control logic 500 can sort the tie mark files into predetermined categories. In one exemplary embodiment, the tie mark files include metadata related to various characteristics of the file, including, timestamp, status, inspector, locations, and other suitable metadata. The metadata can then be grouped according to like categories, which can be predetermined or generated by the device. In another exemplary embodiment, the predetermined categories can include "NOT STARTED," referring to tie mark files that have been downloaded from the server but not yet interacted with on the client device; "IN PROGRESS," referring to tie mark files that have been interacted with on the client device but not yet marked as completed; "COMPLETED," referring to tie mark files that have been marked as completed; or "RECENTLY WORKED," referring to the files that have been most recently downloaded, accessed, viewed, or otherwise interacted with. It will be appreciated that a myriad of other categories could be used, such by geographical location, number of ties remaining to be inspected, priority, etc. The control logic 500 then proceeds to step 516.

At step 516, the control logic 500 can extrapolate various data related to the railroad tie file. In one exemplary embodiment, a selection of a particular tie mark file can be received (e.g., file name, timestamp, locations, etc.), and the system can generate a display of the tie mark file details at step 518. In one exemplary embodiment, the control logic 500 can generate and display a graphic showing one or more railroad ties. In another exemplary embodiment, the graphic can be processed by the control logic 500 to create one or more indicators to characterize each railroad tie, using the railroad tie information from the railroad tie file. An entry of milepost designation can then be received at step 520 (which, in one embodiment, communicates to the system at which milepost the user will be inspecting ties), followed by a direction entry at step 522, to indicate the direction of the inspection. In another exemplary embodiment, the direction entry can be either "INCREASING" or "DECREASING," corresponding to west and east, respectively. The control logic 500 then awaits user input and can either proceed to step 524 if an "inspect" command is received, step 540 if a "settings" command is received, or step 542 if an "audit" command is received.

At step 524, the control logic 500 can receive an "inspect" command. In one exemplary embodiment, the inspect command can generate a graphic showing one or more rail ties for a section of track associated with the tie file. In another exemplary embodiment, the inspect command can display a rail tie status indicating the nature or condition of each rail tie in the tie file. In another exemplary embodiment, tie status indicator can be generated for each rail tie. In another exemplary embodiment, a symbol or character can be generated by the control logic by correlating the tie status with a library of status indicators to display the relevant indicator at or near each rail tie on the client device display. The control logic 500 then proceeds to step 526.

At step 526, an inspection process can be instantiated to inspect the data of a tie mark file. In one exemplary embodiment, the graphic can indicate the tie type, the tie number, attributes or characteristics related to the railroad tracks, or other relevant information. In another exemplary embodiment, the rail tie status can indicate the nature or condition of the rail tie. In another exemplary embodiment, the control logic can generate and display one or more status for a rail tie such that a user can select an appropriate status. In another exemplary embodiment, the control logic 500 can generate controls for incrementing or decrementing through each rail tie. Once the desired rail tie is selected the control logic 400 can receive input from a user indicating the status of the rail tie. The control logic 500 then proceeds to step 528.

At step 528, when the inspection is complete, the control logic 500 can receive and confirm a save command. In one exemplary embodiment, the progress of an inspection can be stored locally on the client device. The control logic 500 then proceeds to step 530.

At step 528, the control logic 500 can receive and confirm a "mark complete" command that terminates the inspection process and writes any and all metadata related to the inspection of rail ties captured by the control logic 500 to the tie mark file. In one exemplary embodiment, the tie file can be marked as completed, ultimately causing the tie mark file to be sorted, categorized, and displayed accordingly on the dashboard system. The control logic 500 then terminates or awaits input to repeat the aforementioned steps.

At step 532, the control logic 500 can receive an "upload" command to upload the completed tie file to a remote location. In one exemplary embodiment, once a locally available tie mark file is marked as complete, an upload command can be received by the control logic 500 to initiate transfer of the completed file to a remote location, such as a server, network storage, or other relevant location. The control logic 500 then proceeds to step 534.

At step 534, the control logic 500 can authenticate a user or communicate with another system that can authenticate the user. In one exemplary embodiment, the control logic 500 can initiate the authentication of user credentials, via authentication key matching, or other suitable authentication method. In another exemplary embodiment, in order for a user to upload a tie file, the user must be authenticated. The control logic then proceeds to step 536.

At step 536, the control logic 500 can determine whether a user authentication is successful. If the authentication 534 fails, the control logic 500 can redisplay a login screen on the client device display and redisplay the login screen until the authentication is successful, or the maximum number of attempts is reached. If the authentication is confirmed, the control logic 500 then proceeds to step 538.

At step 538, the control logic 500 can upload one or more updated tie mark files from the client device to the remote location, via an encrypted or unencrypted network connection. The control logic 500 then terminates or awaits new input and can repeat the aforementioned steps.

Figure 6A:
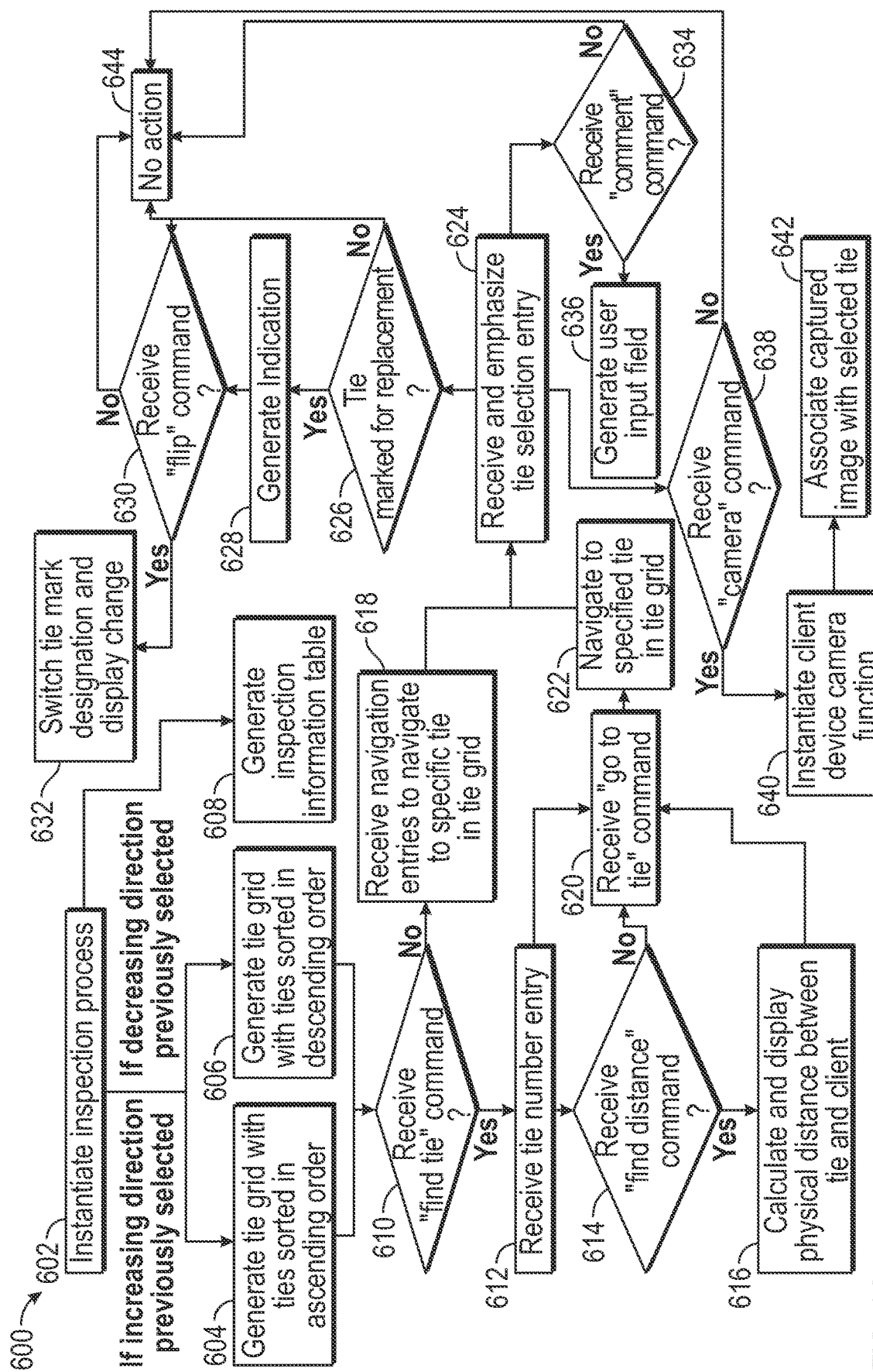
FIGS. 6A-6B illustrate railroad tie inspection control logic in accordance with one or more exemplary embodiments of the present disclosure.
Figure 6B:
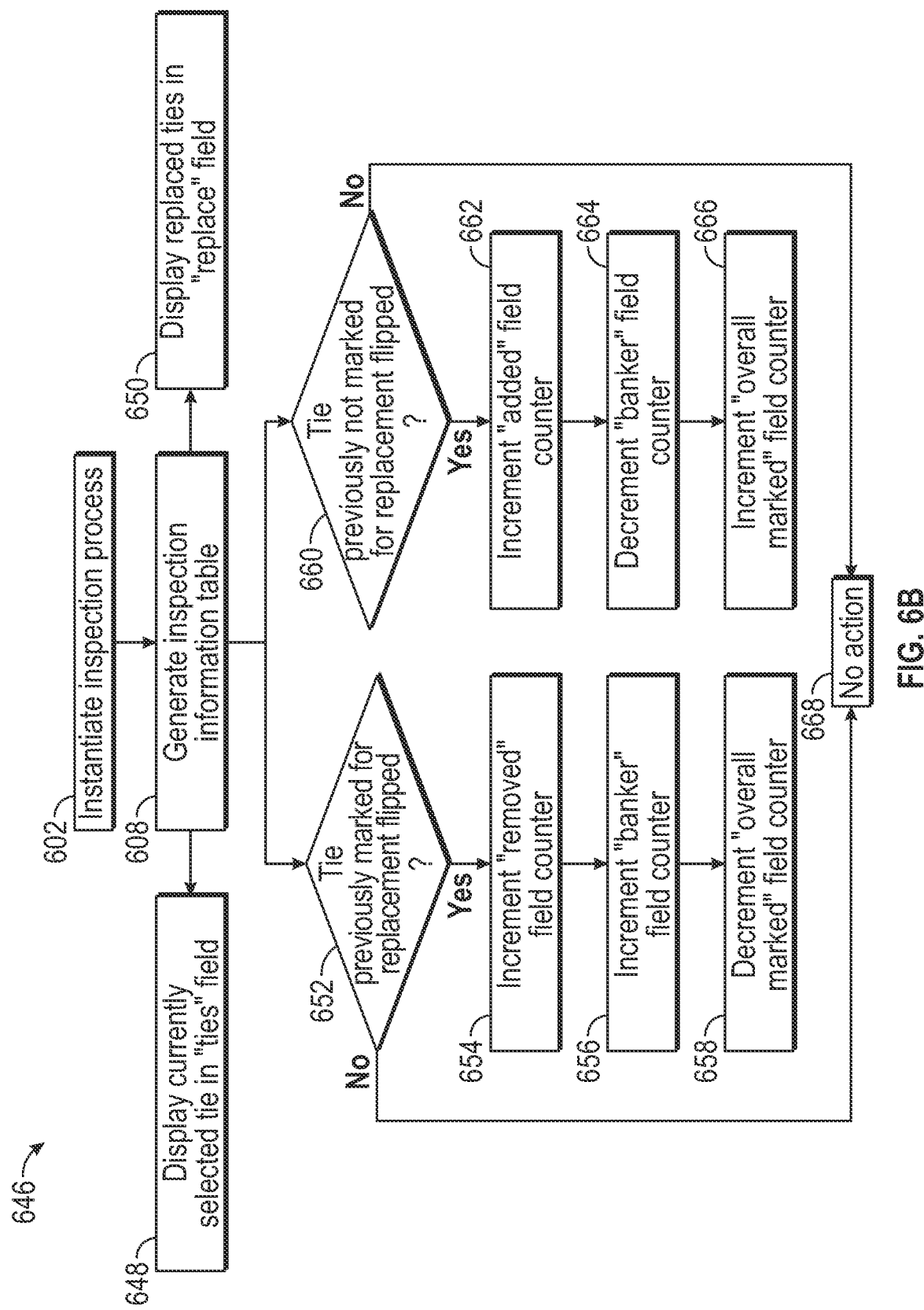

FIGS. 6A-6B illustrate a flow chart diagram 600 (beginning on FIG. 6A and continuing on FIG. 6B) exemplifying control logic embodying features of a method for railroad tie inspection, in accordance with one or more exemplary embodiments of the present disclosure. The railroad tie inspection control logic 600 can be implemented as an algorithm on a server, a machine learning module, or other suitable system. The railroad tie inspection control logic 600 can be achieved with software, hardware, an application programming interface (API), a network connection, a network transfer protocol, HTML, DHTML, JavaScript, Dojo, Ruby, Rails, other suitable applications, or a suitable combination thereof.

Referring to FIG. 6A, the railroad tie inspection control logic 600 process flow of the present embodiment can begin at step 602, where the control logic 500 can instantiate an inspection process. Upon instantiation of the inspection process 602, an inspection information table can be generated at step 608. As discussed with respect to FIG. 5, the user can select either an INCREASING or DECREASING direction when selecting a tie mark file for inspecting and prior to inspection process instantiation. At step 604, in one exemplary embodiment, if the INCREASING direction is selected, the control logic 600 can generate a tie grid with ties sorted in ascending order by tie number. At step 606, if the DECREASING direction is selected, the control logic 600 can generate a tie grid with ties sorted in descending order by tie number.

At step 610, the generated tie grid can be responsive to a number of user inputs. For example, a find tie command can be received, which can prompt the user to enter a desired tie number. If the find tie command is received, the control logic proceeds to step 612. If the find tie command is not received, the control logic proceeds to step 618.

At step 612, the tie number entry can be received by the control logic 600. At step 614, a find distance command can be received by the control logic 600. At step 616, the control logic 600 can calculate and display a physical distance between the tie specified and the client device. In one exemplary embodiment, such distance calculation can utilize, for example, a GPS receiver operably coupled to a client device, such as, for example, a mobile smart device (permission for which can be granted, for example, when permissions are requested such as in FIG. 5 at 510). At step 620, a go to tie command can be received to navigate a user to the specified tie in the tie grid at step 622.

At step 618, the control logic can receive navigation entries to navigate to a specific tie in the tie grid. In another exemplary embodiment, instead of using control logic 600 generated commands, a user can use manual entries (e.g., scrolling, arrow keys, or any other suitable user input interface) to manually navigate to a specific tie in the tie grid.

At step 624, once a desired tie is navigated to, a selection entry of a specific tie can be received and emphasized. In one exemplary embodiment, the control logic 600 can display a selected tie on the client device, such that the selected tie can be highlighted, colored, bolded, or otherwise made to stand out from non-selected ties in the tie grid.

At step 626, a tie can be marked for replacement. In one exemplary embodiment, such designation is already programmed into the tie mark file. The control logic 600 can parse the attributes for a particular tie from the tie file and render the tie on the client device pursuant to such attributes.

At step 628, the control logic can generate an indication to inform the user of the attributes for the tie and the tie is so marked. In one exemplary embodiment, the indication can be visual (color), tactile (vibration), audible (sound), etc.), or other relevant user indication.

If a tie is not marked for replacement at step 626, the control logic 600 can determine that no action should be taken at step 644. In one exemplary embodiment, the user can tag the tie with metadata indicating that no action should be taken, via the control logic 600. At step 630, a FLIP command can also be received by the control logic 600. The FLIP command can be selected by the user via the client device.

At step 632, the designation (status) of the tie can be switched between action and no action, and the control logic can display such change to the user. In another exemplary embodiment, a tie marked for replacement will no longer be marked for replacement, and a tie not so marked will become so marked.

At step 634, a COMMENT command can be received by the control logic 600. In one exemplary embodiment, the tie grid can be navigable via user input commands such as PREVIOUS and NEXT, wherein the commands navigate the grid and select the tie immediately adjacent to the currently selected tie in the indicated direction. In another exemplary embodiment, this functionality can be coupled with a controller, such as a Bluetooth wireless controller.

At step 636, the control logic can generate a user input field that can allow a user to input data about the specific tie. In one exemplary embodiment, the control logic 600 can tag the tie in the file with metadata indicating the user-generated or selected tie data.

At step 638, it is determined whether the control logic 600 received a CAMERA command. In one exemplary embodiment, the client device can include a camera. If no camera command is received, the control logic continues to step 644. If a CAMERA command is received, the control logic continues to step 640.

At step 640, the control logic can instantiate a client device camera function (such permissions attainable, for example, at step 510 of FIG. 5). In one exemplary embodiment, the control logic 600 can capture one or more images via the client device camera. At step 642, the control logic 600 can associate a captured image with a selected tie. In one exemplary embodiment, the control logic 600 can store the images as metadata associated with a particular rail tie in or appended to the tie file.

Referring to FIG. 6B after instantiation of the inspection process at step 602. As above, at step 608, an inspection information table can be generated that can include a number of displays and fields. At step 648, the control logic 600 can display the currently selected tie in the TIES field using the data contained in the information table. At step 648, the control logic 600 can display the ties replaced in the REPLACE field 650. The control logic 600 can also display the number of ties previously marked for replacement that have been removed from such category in the REMOVED field; the ADDED field can indicate how many ties have been added to the total ties-marked-for-replacement count; the BANKER field can display the difference between the REMOVED and ADDED fields as an indication of tie allotment to those categories; and the OVERALL MARKED field can indicate how many ties in the selected tie mark file are marked for replacement.

The control logic 600 can automatically update fields in response to user interaction with the tie grid. The control logic can include registers that can store incrementation and decrementation counter values. At step 652, if a tie that was previously marked for replacement is "flipped," at step 654, the REMOVED field counter can be incremented. In one exemplary embodiment, flipping the field can indicate that a marked tie has been removed. At step 656, this increment can then cause an increment in the BANKER field counter (indicating that the user has an "extra" tie, because the previously-marked tie is no longer marked for replacement, meaning a new tie will not be needed, so such new tie is available for use in the "bank"), or alternatively, the increments can happen simultaneously.

At step 660, if a tie that was not previously marked for replacement is "flipped" to become marked for replacement, the ADDED field can be incremented by the control logic 600 accordingly. This increment can then cause the BANKER field to be decremented by the control logic at step 664, indicating that a new tie is "withdraw" from the "bank" to replace the tie now marked for replacement. The increments and decrements in the inspection information table can likewise affect the OVERALL MARKED field counter, causing decrements at step 658 and increments at step 666 as appropriate. At step 668, the control logic can take no action. The control logic 600 then terminates or awaits new input and can repeat the aforementioned steps.

Figures 7A, 7B:
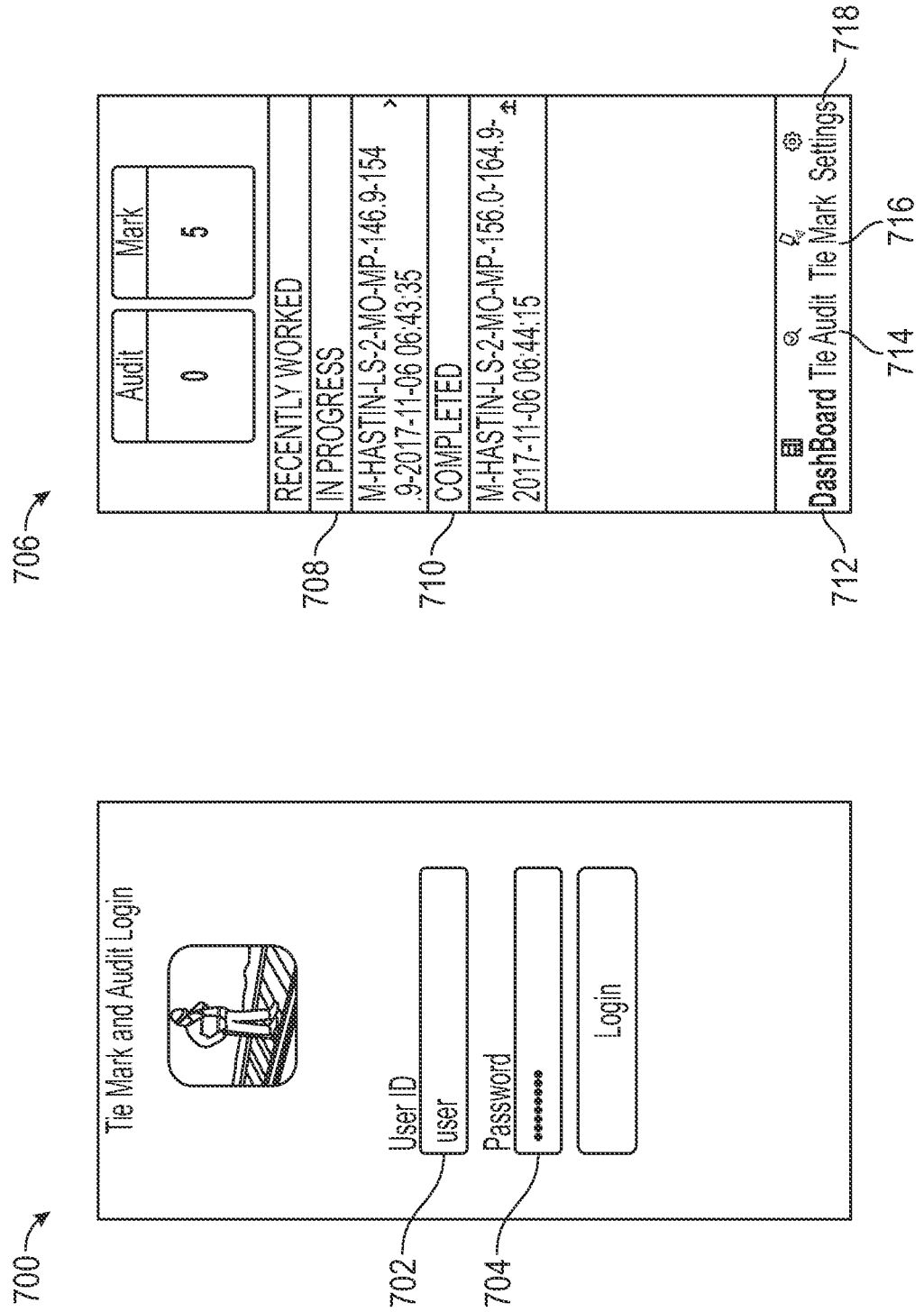
FIGS. 7A-7B illustrate an exemplary embodiment of a railroad tie management system component in accordance with one or more exemplary embodiments of the present disclosure.

FIGS. 7A and 7B illustrate a railroad tie management system component, in accordance with one or more exemplary embodiments. In one exemplary embodiment, a mobile application on a client device can request to connect with the railroad tie management system server and displays a dashboard. Referring to FIG. 7A, Authentication is required via a login screen 700 where the user can input a user identification 702 and password 704. If authentication is successful, the mobile application can instantiate a dashboard system 706. For example, sections of track can be organized into files, with the files listing the tie status and corresponding metadata. These track sections can vary in length based upon the number of identified issues in a particular section of track, the equipment available, the location accessibility, and other relevant parameters. In one exemplary embodiment, the client device has tie mark files available locally, enabling the dashboard system 706 to sort the tie mark files for increased accessibility. The tie mark files can be sorted according to sequential search, bubble search, or quick search algorithms, among others.

In one exemplary embodiment, a tie mark file's metadata can indicate the status of the inspection of a particular section of track. In another exemplary embodiment, the status can be identified as IN PROGRESS 708, COMPLETED 710, NEW, or other relevant indication. In another embodiment, the dashboard system 706 can receive commands to instantiate a number of subsystems via navigation links. Such links can include links: DASHBOARD 712, TIE AUDIT 714, TIE MARK 716, SETTINGS 718, among other links. In another exemplary embodiment, the number of ties marked or audited can be displayed by the dashboard system 706 on the client device.

FIGS. 8A, 8B, and 8C illustrate a railroad tie management system component, in accordance with one or more exemplary embodiments. The TIE MARK navigation link 716 (depicted in FIGS. 7A and 7B) can instantiate, for example, a tie mark retrieval system 800. In this exemplary embodiment, the tie mark retrieval system 800 can perform as a subsystem of the dashboard system 706, wherein the available local files (e.g. 810) remain sorted into multiple categories 804, 806, 808. This tie mark retrieval system subsystem 800 can generate a file retrieval request (for example, via the "+" user input link in the top right corner) that can be transmitted to the railroad tie management system server. The server can require authentication, such as via a login screen 812, and subsequently request permissions from the user 814 to allow the server (and/or the mobile application in operable communication with the server) to control certain aspects of the client device. Once the authentication is completed and needed permissions are granted, the server can provide tie mark files to the client device for download, as seen in FIGS. 9A-9D.

In one exemplary embodiment, the tie mark files can first be organized by subdivision (i.e. HASTINGS or ST CROIX) as seen in 900. After receiving a subdivision selection, the client can be served ranges of tie mark files organized by, for example, milepost range (designated by, for example, —MP—173.0-202.0, indicating that the titled tie mark file includes ties from milepost 173 to milepost 202 in that specific subdivision), as seen in 902. Multiple other fields can also be associated with the tie mark file ranges, such as plan number, track code, and line segment. A DOWNLOAD or DOWNLOAD ALL command can then be received to enable the client to retrieve copies of the selected tie mark files from the server. Once the tie mark files are available locally, they can be sorted accordingly as seen in 904. A given tie mark file can then be selected, prompting the generation of tie mark file details as seen in 906. Such details can include the division, subdivision, line segment, track type, milepost range, the date of last inspection, the status of the tie mark file, and the milepost direction. In one exemplary embodiment, the MILEPOST DIRECTION field can be toggled by the user to select either an INCREASING or a DECREASING direction 908. Once this is completed, an inspection process can be instantiated via, for example, the INSPECT command (for example, in the top right corner in FIG. 9D).

FIGS. 10A-10F illustrate a railroad tie management system component, in accordance with one or more exemplary embodiments. In one exemplary embodiment, when an inspection process is instantiated with a tie mark file, an inspection information table 1000 and a tie grid 1018 are generated. The inspection information table can include a number of fields, such as TIES 1002, REPLACE 1004, ADDED 1006, REMOVED 1008, MILEPOST 1010, OVERALL MARKED 1012, BANKER 1014, and AURORA# 1016 (corresponding to an inspection previously performed by, for example, Aurora® scanning technology, which data can be, in one embodiment, previously incorporated into the tie mark file). The inspection information table can be responsive to interaction with the tie grid in accordance with principles of the present disclosure. The tie grid 1018 can include a number of fields, such as: TIE TYPE 1020, corresponding to the type of tie (i.e. wood, concrete, metal, composite, etc.); INT 1022, referring to the internal density score of the tie as determined by, for example, an Aurora® scanner; TIE NO 1024, corresponding to the tie identification number; CRVCAT 1026, referring to the curve category of the tie; CMB 1028, corresponding to the combination of the INT score and the EXT score; and EXT 1030, corresponding to the external score of the tie (i.e. the score determined by examining the surface of the tie). In an exemplary embodiment, TIE TYPE can display WT (for wood tie), CT (concrete tie), X (crossing tie), or T (turnout tie). In another exemplary embodiment, CRVCAT can display T (tangent curve), L (light curve), M (moderate curve), or S (severe curve). In another exemplary embodiment, the INT, EXT, and CMB scores are displayed as decimal numerals from 1.0-4.0.

In one exemplary embodiment, tie scores (i.e. INT, EXT, and CMB) can range from 1.0-4.0 as determined via, for example, an Aurora® scanner, in accordance with the following chart:

| | TIE GRADE CLASSIFICATION | | | |
| --- | --- | --- | --- | --- |
| CONDITION | 3.5-4.0<br>Failed<br>(BLACK) | 2.7-3.4<br>Maintenance<br>(RED) | 1.5-2.6<br>Marginal<br>(YELLOW) | 1.0-1.4<br>Good<br>(GREEN) |
| Broken | Broken through - separated | Broken through - Not separated | Not broken through | No Breaks |
| Split or Otherwise Impaired | To the extent the crossties will allow ballast to work through, or will not hold spikes or rail fasteners | Will not hold spikes or rail fasteners. Loose spikes in curves greater than 2 degrees. | Tie holds spikes, some splits deep enough to allow water into tie. Tie can be plugged and re-spiked if in tangent or curves 2 degrees and less. | Slight weather splits but integrity not compromised |
| Deteriorated | So that the tie plate or base of rail can move laterally more than ½ inch relative to the crosstie | So that the tie plate or base of rail can move laterally more than ¼ inch but less than ½ inch relative to the crosstie | Less than ¼ inch of lateral plate or rail movement | No plate movement or cut and no sign of deterioration |
| Plate Cut | More than 40% of the ties' thickness | More than 1 inch but less than 40% of the ties' thickness | Greater than ¼ inch, up to 1 inch in depth | ¼ inch plate cut or less. |
| Wheel Cut | | More than 2 inches deep within 12 inches of the base of the load-bearing area, not broken through the tie. | ½ inch to 2 inches deep not broken through the tie | ½ inch or less with no structural damage to tie |
| Rotted or Hollow | | Substantial amount of | Some rot over tie and on ends. Not hollow under | None |

| | TIE GRADE CLASSIFICATION | | | |
|---|---|---|---|---|
| CONDITION | 3.5-4.0<br>Failed<br>(BLACK) | 2.7--3.4<br>Maintenance<br>(RED) | 1.5-2.6<br>Marginal<br>(YELLOW) | 1.0-1.4<br>Good<br>(GREEN) |
| | | wood decayed<br>or missing.<br>Hollow under<br>plate area. | plate area. | |
| Expected<br>Remaining<br>Life | | | Less than 20 years | 20 years or<br>greater |

In one exemplary embodiment, the tie grid 1018 can be color-coded in accordance with the above chart (i.e. ties with a CMB of 3.5-4.0 are highlighted black, 2.7-3.4 are highlighted red, 1.5-2.6 are highlighted yellow, and 1.0-1.4 are highlighted green). Additionally, ungraded ties (such as ties that cannot be scanned by, for example, an Aurora® scanner, i.e. ballast covered ties, ties obscured by heavy vegetation or mud spots, ties on turnouts and road crossings, ties on inner guard rail locations, etc.) can be highlighted blue and have an INT, EXT, and CMB of −1.0 to indicate that they are ungraded. In another exemplary embodiment, a user command can be received to enter a manual INT, EXT, and/or CMB for an ungraded tie.

Figures 10A, 10B, 10C:
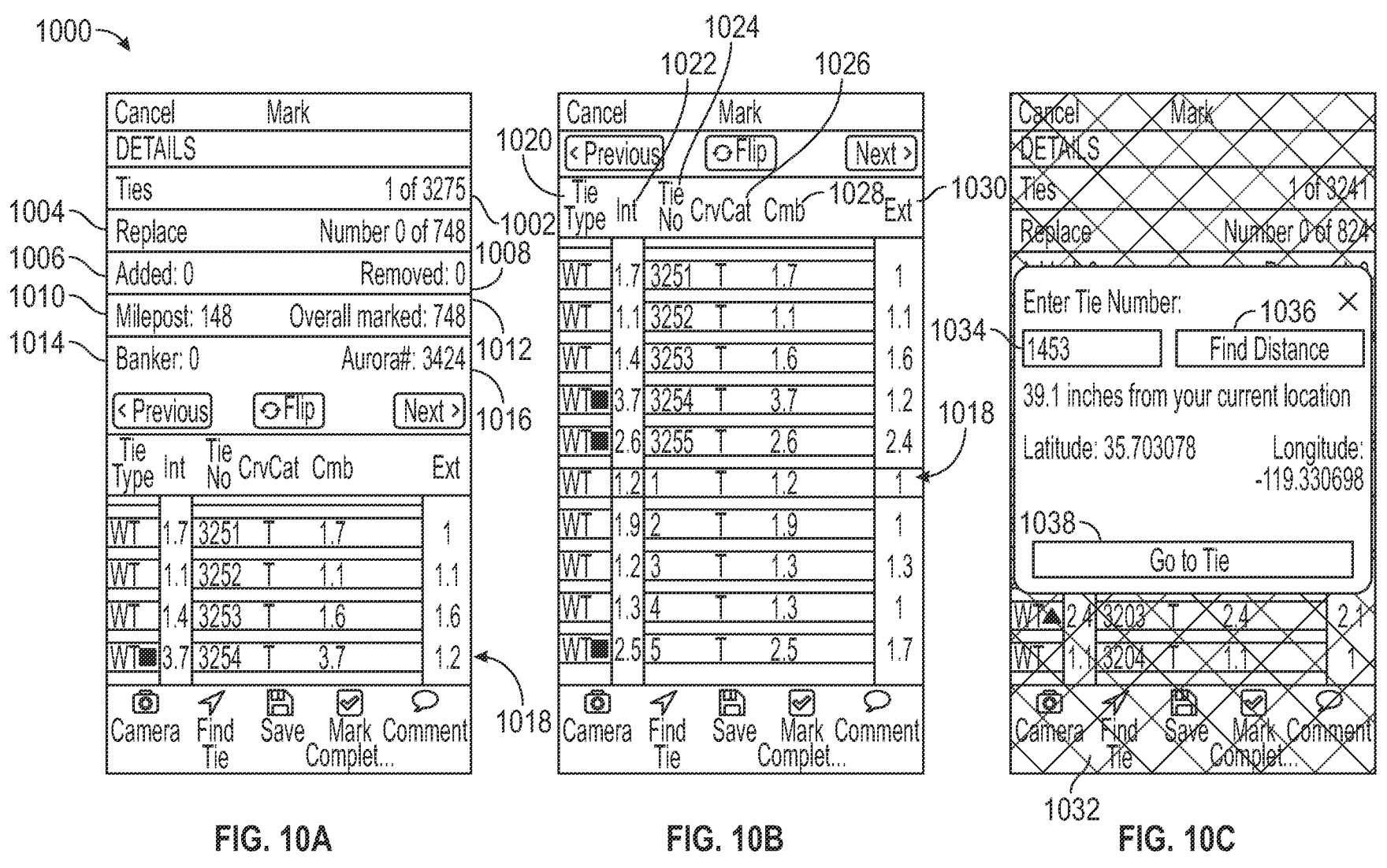
Figures 10D, 10E, 10F:
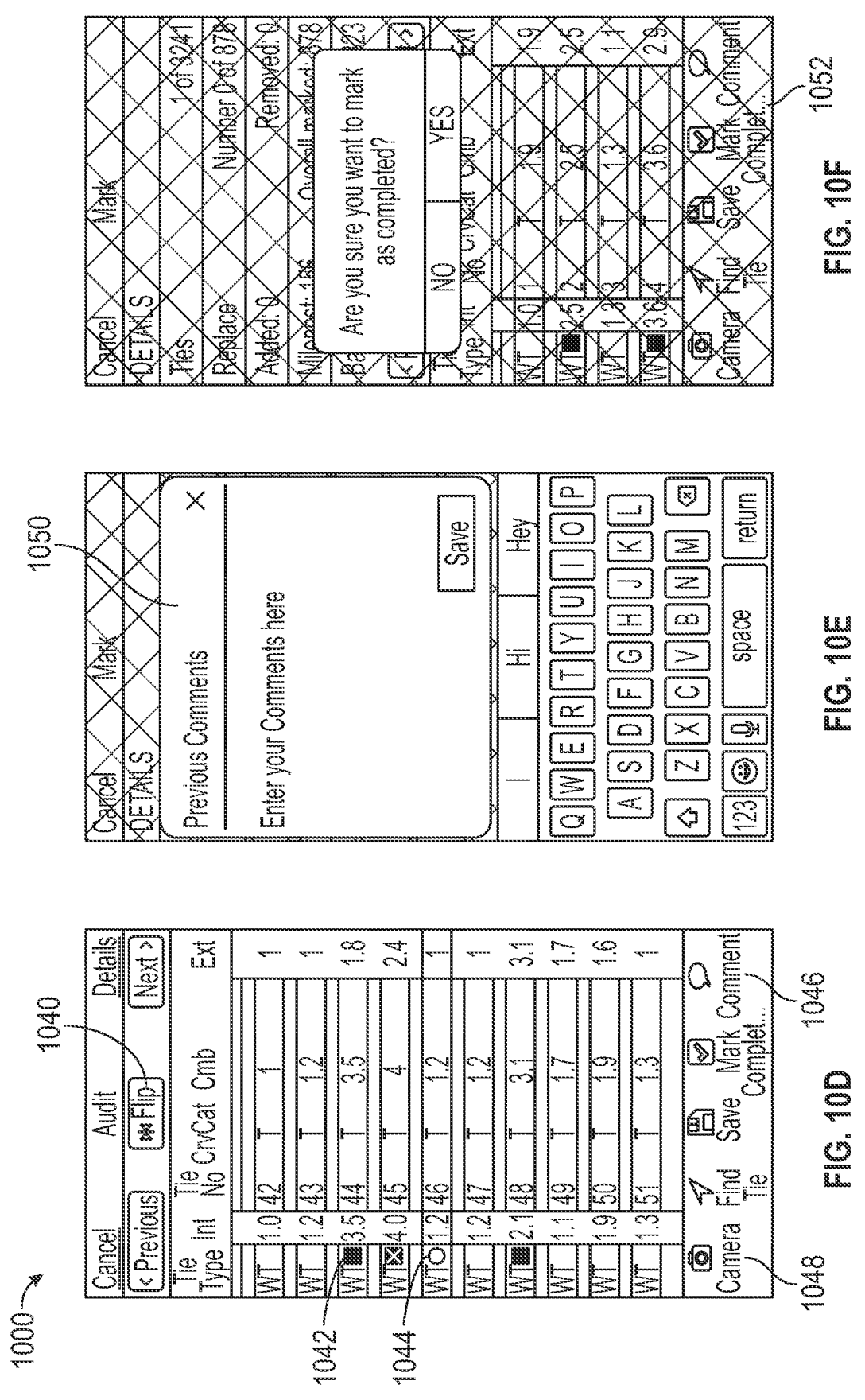

In one exemplary embodiment, the tie grid 1018 can be navigated manually, e.g., a user can "scroll" through the grid to locate the desired tie. In another exemplary embodiment, a FIND TIE command 1032 can be received which subsequently prompts a user to enter the tie number 1034 that the user would like to navigate to. After entering the tie number 1034, the FIND DISTANCE command can also be received, calculating and displaying the physical distance between the client device and the specified tie, as well as the latitude and longitude of the specified tie. After the tie number entry 1034 is received, the GO TO TIE command 1038 can be received, which automatically navigates the user to the specified tie in the tie grid. While navigating the tie grid, specific ties can be selected, and such selection can be emphasized, for example, via highlighting as seen in FIG. 10D. In one embodiment, ties marked for replacement can have a visual indicator 1042 disposed in the TIE TYPE column (e.g. here, a square 1042). If a FLIP command 1040 is received for a tie marked for replacement, the tie will be marked accordingly; for example, a red X can appear in the black box 1042 indicating that the tie is no longer marked for replacement. In another exemplary embodiment, if a FLIP command 1040 is received for a selected tie that was not marked for replacement, a visual indicator 1044 can be disposed in the TIE TYPE column (e.g. here, a circle 1044).

In another exemplary embodiment, a CAMERA command 1048 can be received that instantiates an image capture function on the client device in accordance with the principles of the present disclosure. In another exemplary embodiment, a COMMENT command 1046 can be received that causes the generation of a user input field 1050 in accordance with the principles of the present disclosure. In another exemplary embodiment, a MARK COMPLETED command 1052 can be received, updating the metadata of the tie mark file to indicate that the file can be sorted into the COMPLETED category in the dashboard system.

Referring to FIGS. 11A and 11B, 1100 displays the dashboard system running a tie mark subsystem, wherein a tie mark file is categorized as COMPLETED. The system can determine that, because the file is COMPLETED, the tie mark file can be retrieved by the server. To instantiate this process, an upload command 1102 can be received, followed by a confirmation 1104. The uploaded tie mark file can then be accessible by other components of the railroad tie management system, such as by other clients.

The present disclosure achieves at least the following advantages:
1. improves organization and accessibility of tie inspections and tie replacements via tie grids and other technological improvements;
2. increases efficiency of tie inspections and tie inspectors via improved systems that can add and modify metadata tags related to tie files;
3. provides a platform for facilitating tie inspections and tie marking; and
4. provides centralized and accessible data sets for ties throughout railroad infrastructure, enabling faster and more-informed decision making.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A rail tie processing system, comprising:
a data storage device comprising a first database with a plurality of tie mark files; and
a networked computer processor operably coupled to the storage device via an encrypted network and capable of executing machine-readable instructions to perform program steps, the program steps comprising:
accessing one or more railroad tie files from memory, each railroad tie file having a file identifier;
determining a railroad tie file status for each tie file;
sorting the railroad tie files according to the file status;
displaying the file identifiers for the sorted railroad tie files on a client device;
generating a file action indicator to selectively process a selected railroad tie file;
receiving the location of a client device;
indicating, on the client device, a start point and a direction of travel to a plurality of rail ties for a section of track based on the selected railroad tie file; and
displaying a graphic showing the plurality of rail ties for the section of track associated with the selected railroad tie file.

2. The system of claim 1, wherein the program steps further comprise the step of generating a rail tie status for the one or more rail ties based on the selected railroad tie file.

3. The system of claim 1, wherein the program steps further comprise the step of generating a tie status indicator for each rail tie in the selected railroad tie file.

4. The system of claim 1, wherein the program steps further comprise the step of receiving input verifying or changing the status of a selected rail tie.

5. The system claim 3, wherein the program steps further comprise the step of identifying one or more ties for a predetermine section of a railroad track.

6. The system of claim 1, wherein the program steps further comprise the step of determining railroad track characteristics and displaying the railroad track characteristics on the client device.

7. The system of claim 1, wherein the program steps further comprise the step of receiving an entry selecting a first rail tie and retrieving metadata associated with the first rail tie via the processor.

8. The system of claim 7, wherein the program steps further comprise the step of generating an indication if the first rail tie is marked for replacement.

9. The system of claim 7, wherein the program steps further comprise the step of instantiating an image capture function of the client and storing a captured image in metadata associated with the first rail tie.

10. The system of claim 7, wherein the program steps further comprise the step of instantiating, via the processor, a user input field and storing input data in the first tie metadata.

11. A method of processing rail ties in a railroad system, the method comprising the steps of:
accessing one or more railroad tie files from memory, each railroad tie file having a file identifier;
determining a railroad tie file status for each tie file;
sorting the railroad tie files according to the file status;
displaying the file identifiers for the sorted railroad tie files on a client device;
generating a file action indicator to selectively process a selected railroad tie file;
receiving the location of a client device;
indicating, on the client device, a start point and a direction of travel to a plurality of rail ties for a section of track based on the selected railroad tie file; and
displaying a graphic showing the plurality of rail ties for the section of track associated with the selected railroad tie file.

12. The method of claim 11, further comprising the step of generating a rail tie status for the one or more rail ties based on the selected railroad tie file.

13. The method of claim 11, further comprising the step of generating a tie status indicator for each rail tie in the selected railroad tie file.

14. The method of claim 11, further comprising the step of receiving input verifying or changing the status of a selected rail tie.

15. The method claim 13, further comprising the step of identifying one or more ties for a predetermine section of a railroad track.

16. The method of claim 11, further comprising the step of determining railroad track characteristics and displaying the railroad track characteristics on the client device.

17. The method of claim 11, further comprising the step of receiving an entry selecting a first rail tie and retrieving metadata associated with the first rail tie via the processor.

18. The method of claim 17, further comprising the step of generating an indication if the first rail tie is marked for replacement.

19. The method of claim 17, further comprising the step of instantiating an image capture function of the client and storing a captured image in metadata associated with the first rail tie.

20. The method of claim 17, further comprising the step of instantiating, via the processor, a user input field and storing input data in the first tie metadata.

* * * * *